United States Patent [19]
Okamoto

[11] Patent Number: 4,625,458
[45] Date of Patent: Dec. 2, 1986

[54] VEHICLE DOOR STRUCTURE

[75] Inventor: Yuzi Okamoto, Toyota, Japan

[73] Assignee: Toyota Jidosha Kabushiki Kaisha, Japan

[21] Appl. No.: 701,913

[22] Filed: Feb. 14, 1985

[30] Foreign Application Priority Data

Mar. 1, 1984 [JP] Japan .............................. 59-29748[U]
Mar. 1, 1984 [JP] Japan .............................. 59-29749[U]

[51] Int. Cl.$^4$ .......................................... E05F 11/38
[52] U.S. Cl. ......................................... 49/374; 49/440
[58] Field of Search ................. 49/374, 348, 502, 440, 49/441, 489; 292/146, 201

[56] References Cited

U.S. PATENT DOCUMENTS 4,409,756 10/1983 Andenino et al. ..................... 49/440
4,454,688 6/1984 Rest et al. ......................... 49/440 X
4,457,111 7/1984 Koike .................................. 49/441

FOREIGN PATENT DOCUMENTS 143419 3/1969 Fed. Rep. of Germany ........ 49/441

*Primary Examiner*—Kenneth Downey
*Attorney, Agent, or Firm*—Parkhurst & Oliff

[57] ABSTRACT

A vehicle door structure is disclosed which includes a door equipped with a door frame. The door frame has a door glass run at an inner peripheral portion which functions to seal a passenger compartment from the exterior of the vehicle. The door glass run comprises an inner lip and an outer lip. The inner lip is in contact with an interior surface of a door glass, and the outer lip is in contact with an exterior surface of the door glass. The outer lip has an inclined tip portion and a prop portion. The inclined tip portion is in contact with the exterior surface of the door glass, and the prop portion can sustain the door glass when it is biased toward the exterior of the door by force generated by a difference in pressure between the passenger compartment and the exterior surface of the door when a vehicle runs at a high speed.

18 Claims, 10 Drawing Figures

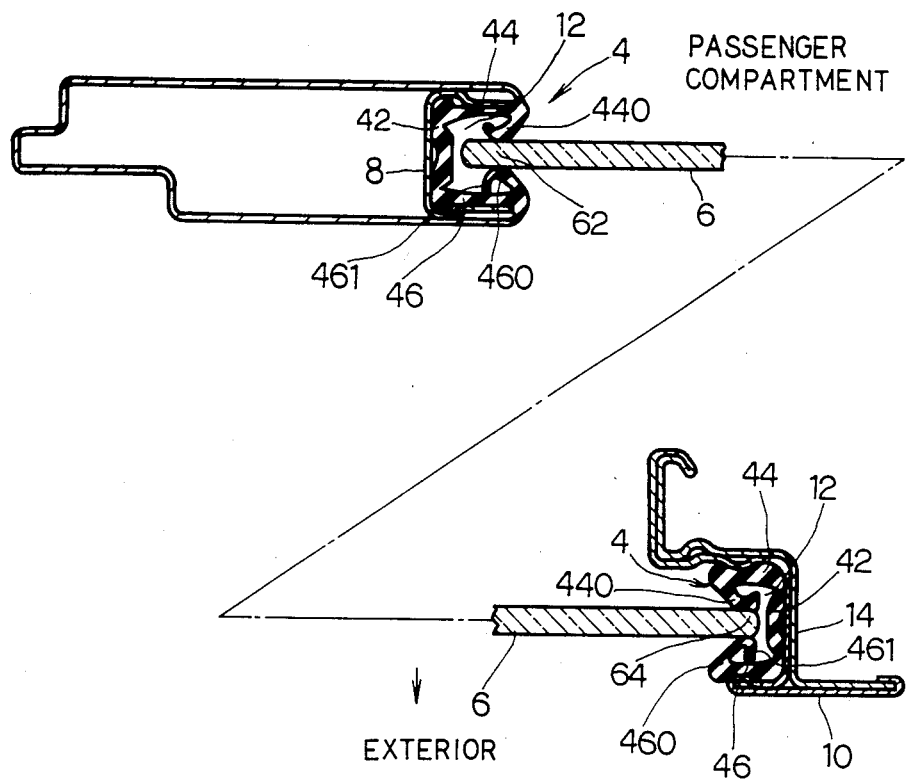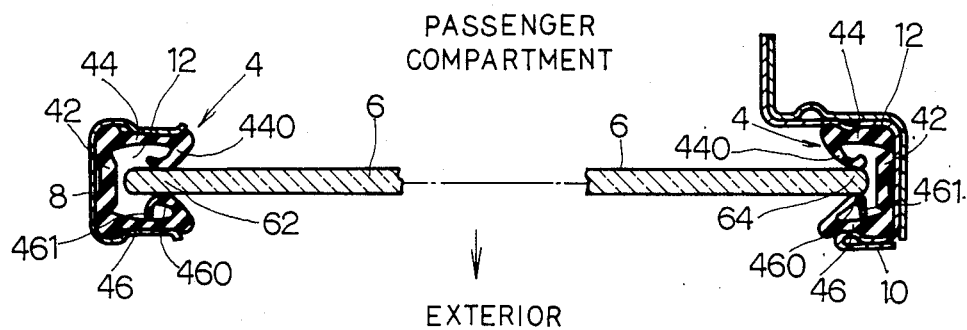

VEHICLE DOOR STRUCTURE

BACKGROUND OF THE INVENTION

The present invention relates to a vehicle door structure having a door frame, and more particularly to a door glass run which is inserted into a channel provided at an inner peripheral portion of a door frame so that the door glass run may guide a door glass during its upward and downward displacement and further may seal a passenger compartment at the time when an upper edge of the door glass is in contact with the inner peripheral portion of the door frame.

Referring to FIG. 1, there is shown a side view of a vehicle door 2 which is equipped with a door frame 10. As shown in FIGS. 8, 9 and 10, the door frame 10 has an inner channel 12 on its inner peripheral edge portion. A door glass run 4 according to a prior art, which is made of rubber, is fitted into the inner channel 12 of the door frame 10. A cross-sectional shape of the door glass run 4, as shown in FIGS. 8 and 9, is formed in substantially a letter "U" shape, and the door glass run 4 comprises a base portion 42 which extends in the lateral direction of the vehicle, an inner lip 44 and an outer lip 46 which are connected with the inner and outer portion of the base portion 42 and which extend in the almost parallel relationship with the longitudinal direction of the vehicle. The inner lip 44 has an inclined tip portion 440. Similarly, the outer lip 46 has an tip portion 460 which is inclined in the almost opposite direction of the tip portion 440. A door glass 6 is fitted in a space defined between the inner and outer inclined tip portions 440 and 460. Further, the door glass 6 contacts the inner and outer tip portions 440 and 460 of the door glass run 4 at its interior and exterior surfaces.

When the door glass 6 is displaced upwardly and downwardly, the front edge 62 of the door glass 6 slides within the door glass run 4, which is provided on a front lower frame 8, and the rear edge 64 of the door glass 6 slides within the door glass run 4 which is provided on a rear portion 14 of the door frame 10, thereby enabling smooth vertical displacement of the door glass 6. When the door glass 6 is upwardly displaced to reach a position indicated by the broken line shown in FIG. 1, an upper edge 66 and an inclined front edge 68 of the door glass 6 are designed to fit into the door glass run 4 which is provided on an upper door frame 16 and an inclined front door frame 18, respectively.

In general, when a vehicle runs at a high speed, the flow speed of air which flows on an exterior surface of a vehicle body increases and this causes the air pressure applied to the exterior surface of the door glass 6 to become less than that applied to the interior surface of the door glass 6. As a result, a door glass is displaced toward the exterior of the vehicle body.

In a vehicle having a door equipped with a door frame, when a door glass is upwardly displaced as the vehicle travels at a high speed, suction pulls the door glass 6 is suctioned toward the exterior of the vehicle body as shown in FIG. 10. The suction is caused by the difference in pressure generated between the exterior of the vehicle body and the passenger compartment.

The door glass run 4 according to the prior art has a space 7 defined between the base portion 42 and the outer lip 46. When a vehicle travels at a high speed, the difference in the air pressure generated between the exterior of the vehicle body and the passenger compartment causes the door glass 6 to be displaced the tip portion 460 of the door glass run 4 bends easily. As a result, the upper edge 66 and the inclined front edge 68 of the door glass 6 are displaced toward the exterior of the vehicle body, thereby preventing the upper edge 66 and the inclined front edge 68 of the door glass 6 from smoothly fitting into the door glass run 4 on the upper door frame 16 and on the inclined front door frame 18. Also, a slide resistance between the door glass 6 and the door glass run 4 increases, because a contact surface formed between the exterior surface of the door glass 6 and the inclined tip portion 460 becomes large.

SUMMARY OF THE INVENTION

The present invention was developed in view of the foregoing background and to overcome the foregoing drawbacks. It is accordingly an object of this invention to provide a vehicle door structure having a door glass run which can sustain the difference in air pressure exerted on a door glass.

To attain the above objects, a vehicle door structure according to the present invention has a door frame which comprises a front portion, an upper portion connected with the front portion, and a rear portion connected with the upper portion. Each of the portions has a channel at its inner peripheral portion. A door glass is mounted on a door so that the door glass may be vertically displaced by an operator in a vehicle. A door glass run is fitted into at least one of the channels of the door frame. The door glass run comprises, an inner lip portion and an outer lip portion. The base portion is secured onto the door frame and extends in the lateral direction of the vehicle. The inner lip portion is connected with an inner end of the base portion and extends in the longitudinal direction of the vehicle in order to contact an interior surface of the door glass. The outer lip portion is connected with an outer end of the base portion and extends in the longitudinal direction of the vehicle. The outer lip portion has a cross-sectional wedge-shaped end which the exterior surface of the door glass contacts.

BRIEF DESCRIPTION OF THE DRAWINGS

The above objects, features and advantages of the present invention will become more apparent from the following description of the preferred embodiments taken in conjunction with the accompanying drawings, wherein:

FIG. 2 is a cross-sectional view taken along the line II—II in FIG. 1, according to a first embodiment of the present invention;

FIG. 3 is a cross-sectional view taken along the line III—III in FIG. 1, according to the first embodiment of the present invention;

DETAILED DESCRIPTION OF THE PREFERRED EMBODIMENTS

The present invention is described in detail with reference to the accompanying drawings which illustrate different embodiments of the present invention.

Figure 1:
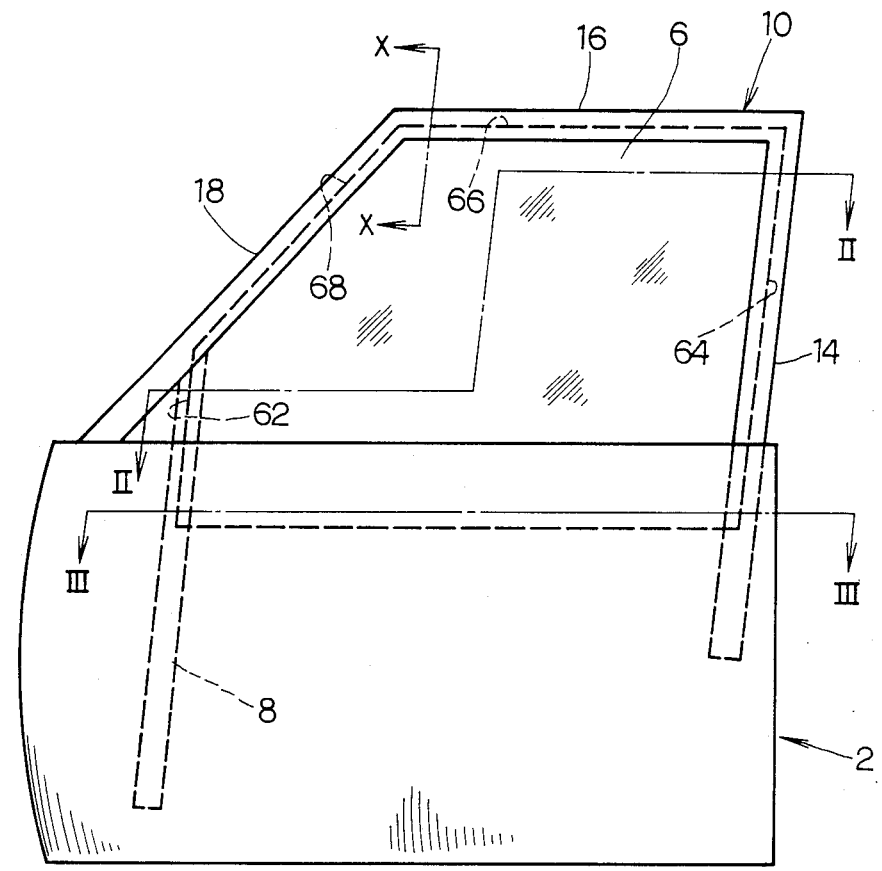
FIG. 1 is a side view of a vehicle door structure.
Figure 4:
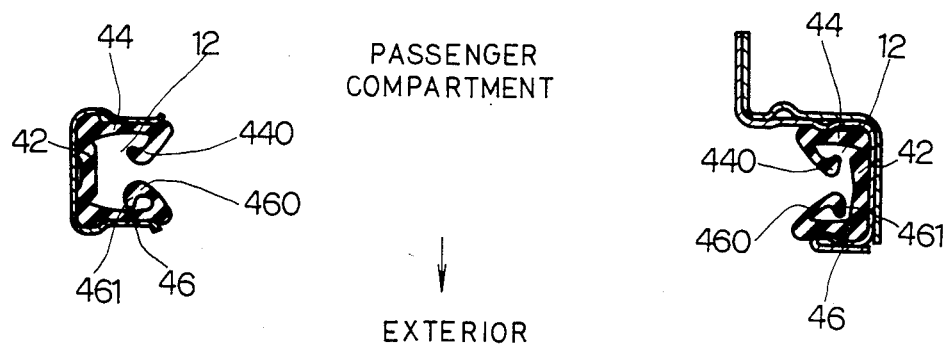
FIG. 4 is a view which shows the vehicle door structure provided under the condition that a door glass is not fitted into the channel in FIG. 3.

FIG. 1 shows a side view of a vehicle door 2 which is equipped with a door frame 10. As shown in FIGS. 2 and 3, the door frame 10 has an inner channel 12 on its inner peripheral edge portion. A door glass run 4 according to the first embodiment of the present invention, is shown in FIGS. 2 and 3. The door glass run 4, which is made of rubber, is fitted into the inner channel 12 of the door frame 10. A cross-sectional shape of the door glass run 4, as shown in FIGS. 2 and 3, is formed in a letter "U" shape. The door glass run 4 comprises a base portion 42, an inner lip 44 and an outer lip 46. The base portion 42 of the door glass run 4 extends in the lateral direction of the vehicle. The inner lip 44 and the outer lip 46 of the door glass run 4 are connected with the inner and outer portions of the base portion 42 respectively and extend in an almost parallel relationship with the door glass. The inner lip 44 has an inclined tip portion 440. Similarly, the outer lip 46 has an inclined tip portion 460 which is inclined in the almost opposite direction of the inclined tip portion 440. Further, a prop portion 461 extends in the lateral direction of the vehicle from the inclined tip portion 460 of the outer lip 46. A door glass 6, as shown in FIGS. 2 and 3, is fitted in the space defined between the inner inclined tip portion 440 and the outer inclined tip portion 460. Further, the door glass 6 contacts the inner inclined tip portion 440 and the outer inclined tip portion 460 of the door glass run 4 at its interior and exterior surfaces. FIG. 4 shows the door glass run 4 provided with the door glass 6 not in place in the door glass run 4. As shown in FIG. 4, when the door glass 6 is not in place in the door glass run 4, the prop portion 461 of the inclined tip portion 460 is spaced from the outer lip 46. On the contrary, when the door glass 6 is in place in the door glass run 4, the prop portion 461 of the inclined tip portion 460 is in contact with the outer lip 46, as shown in FIG. 3.

When the door glass 6 is displaced upwardly and downwardly, the front edge 62 of the door glass 6 slides within the door glass run 4 which is provided on a front lower door frame 8, and the rear edge 64 of the door glass 6 slides within the door glass run 4 which is provided on a rear portion 14 of the door frame 10 in order to enable smooth vertical displacement of the door glass 6. When the door glass 6 is upwardly displaced to reach a position indicated by the broken line shown in FIG. 1, an upper edge 66 and an inclined front edge 68 of the door glass 6 are designed to be fitted into the door glass run 4 which is provided on an upper door frame 16 and an inclined front door frame 18, respectively.

When a vehicle runs at a high speed, the flow speed of air which flows on an exterior surface of a vehicle body increases and this causes the air pressure, applied to the exterior surface of the door glass 6, to become less than the air pressure applied to the interior surface of the door glass 6. Hence, when a passenger moves the door glass 6 upwardly in order to close the door window, the door glass 6 is inclined to move toward the exterior surface of the door. In this condition, the prop portion 461 of the inclined tip portion 460 of the door glass run 4 is in contact with the outer lip 46 as shown in FIGS. 2 and 3. Further, when the prop portion 461 of the inclined tip portion 460 is in contact with the outer lip 46, the cross-sectional shape of the outer lip 46 is formed in a wedge-shape, thereby enabling the outer lip to sustain the displacement of the door glass 6 toward the exterior of the door through the prop portion 461 of the inclined portion 460. The inclined tip portion 440 of the inner lip 44 is spaced from the inner lip 44 even when the door glass 6 is fitted into the door glass run 4, as shown in FIGS. 2 and 3. This design reduces slide resistance between the door glass 6 and the door glass run 4, because a contact surface formed between the exterior surface of the door glass 6 and the inclined tip portion 460 of the door glass run 4 is small. Hence, the inclined tip portion 440 of the inner lip 44 can move. The door glass run 4 may be provided on at least the front lower door frame 8 and the rear portion 14 of the door frame 10.

Figure 5:
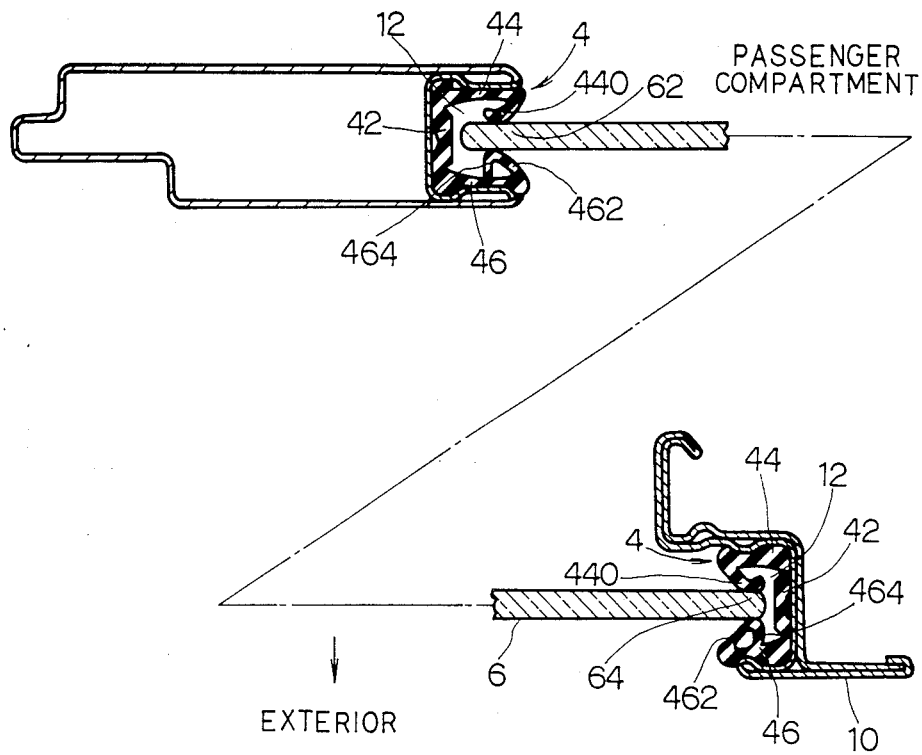
FIG. 5 is a cross-sectional view taken along the line II—II in FIG. 1, according to a second embodiment of the present invention.
Figure 6:
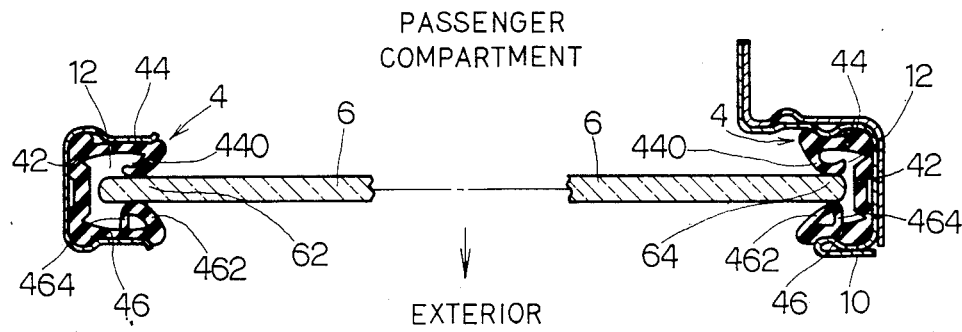
FIG. 6 is a cross-sectional view taken along the line III—III in FIG. 1, according to the second embodiment of the present invention.
Figure 7:
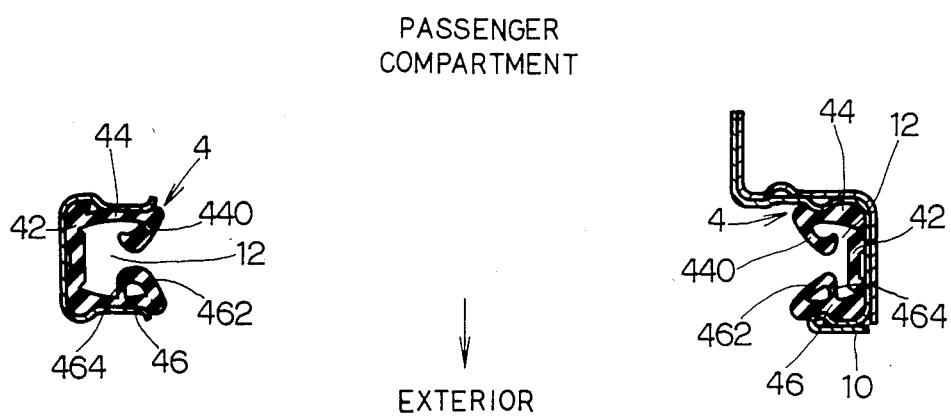
FIG. 7 is a view which shows the vehicle door structure provided under the condition that a door glass is not fitted into the channel in FIG. 5.
Figure 8:
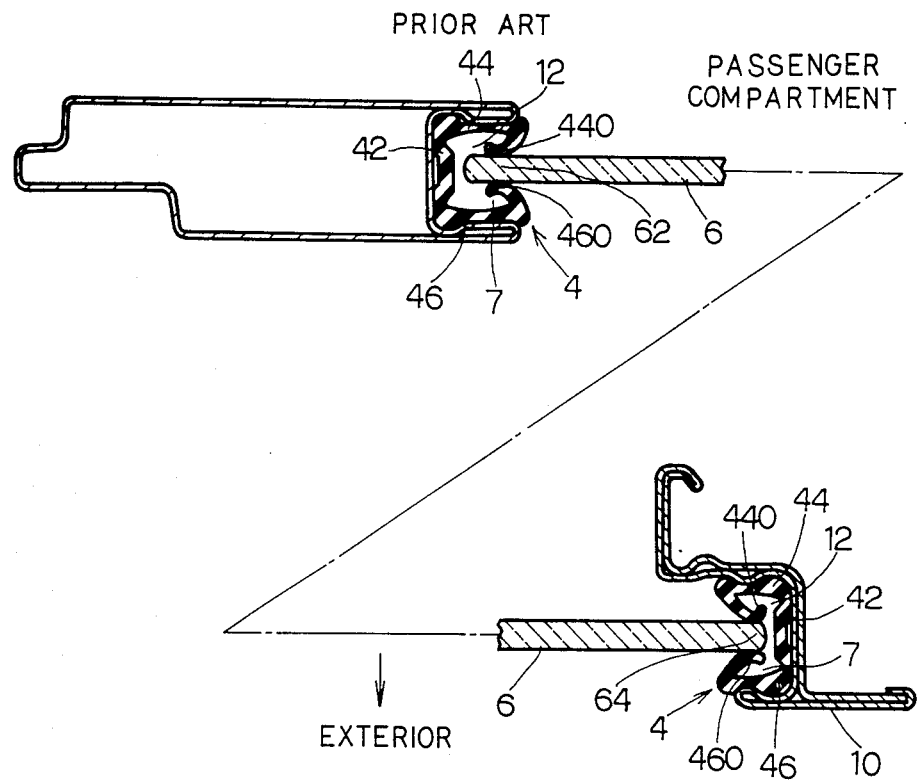
FIG. 8 is a cross-sectional view taken along the line II—II in FIG. 1, according to a prior art.
Figure 9:
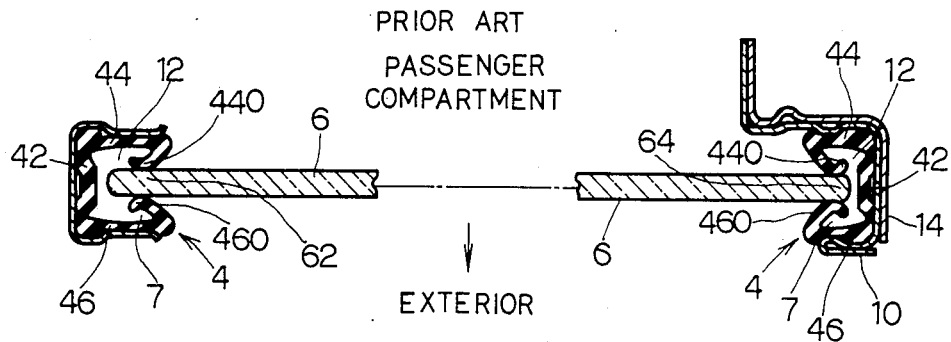
FIG. 9 is a cross-sectional view taken along the line III—III in FIG. 1; according to a prior art.
Figure 10:
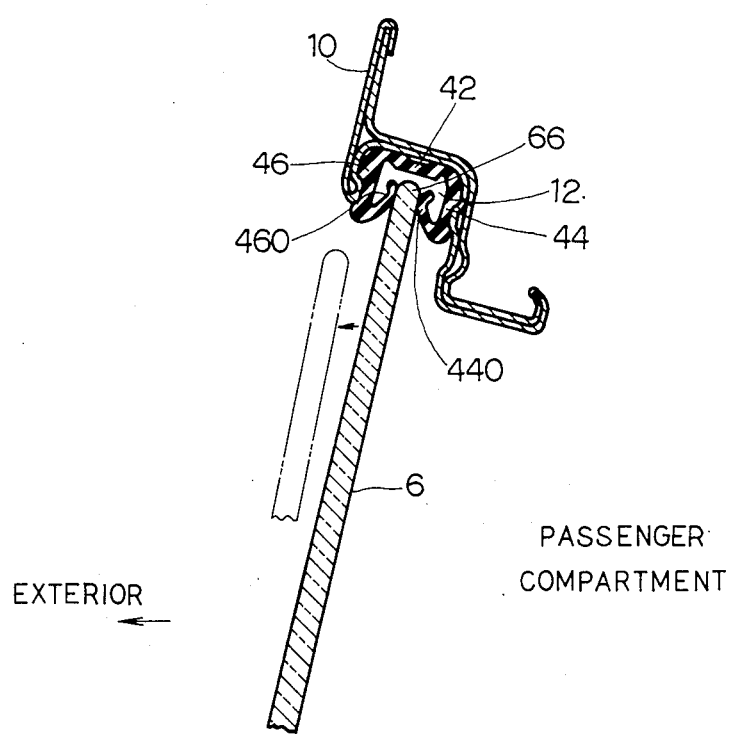
FIG. 10 is a cross-sectional view taken along the line X—X in FIG. 1, according to a prior art.

FIGS. 5 to 7 show a door glass run 4 according to the second embodiment of the present invention. There is a difference between the first and second embodiment. The door glass run 4 according to the first embodiment has the prop portion 461 of the inclined tip portion 460 which is separated from the outer lip 46. The door glass run 4 according to the second embodiment has the prop portion 464 of the inclined tip portion 462 which is connected to the outer lip 46 as shown in FIGS. 5 to 7. The cross-sectional shape of the inclined tip portion 462 of the outer lip 46 of the door glass run 4 according to the second embodiment, is formed in a wedge shape. Further the inclined tip portion 462 of the outer lip 46 has a space therein, so that the inclined tip portion 462 of the outer lip 46 obtains its flexibility.

While the present invention has been described in its preferred embodiments, it is to be understood that the invention is not limited thereto, and may be otherwise embodied within the scope of the following claims.

What is claimed is:

1. A vehicle door structure, comprising:
    a door frame having a front portion, an upper portion connected with the front portion, and a rear portion connected with the upper portion, each of said front, upper and rear portions having a channel at an inner peripheral portion;
    a door glass mounted on a vehicle door so that the door glass is vertically displaceable by an operation of a passenger of a vehicle;
    a door glass run fitted into at least one of the channels of said front, upper and rear portions of the door frame, the door glass run comprising a base portion secured to the door frame and extending laterally across the vehicle, an inner lip portion connected with the base portion and extending longitudinally along the vehicle to contact an interior surface of the door glass at its tip end, and an outer lip portion connected with the base portion and extending longitudinally along the vehicle, the outer lip portion having a tip end which is wedge-shaped in cross section, said door glass contacting the outer lip portion, whereby when a door glass is upwardly displaced and the vehicle is traveling at a high speed, which creates unequal pressures between an exterior and an interior of the vehicle, resulting in a force directed toward the exterior of the vehicle, said outer lip portion functions to smoothly displace the door glass.

2. The vehicle door structure of claim 1, wherein the tip end of the outer lip portion of the door glass run is a closed end which has a space therein to be flexible, and the tip end of the outer lip portion is integral with the outer lip portion of the door glass run.

3. The vehicle door structure of claim 1, wherein the door glass run is provided in at least the channel of the front and rear portions of the door frame.

4. The vehicle door structure of claim 1, further comprising an inclined portion which connects the front portion of the door frame with the upper portion of the door frame, said inclined portion having a channel at an inner peripheral portion thereof.

5. The vehicle door structure of claim 3, wherein the door glass run is provided in the channel of the upper portion of the door frame.

6. The vehicle door structure of claim 4, wherein the door glass run is provided in the channel of the inclined portion of the door frame.

7. The vehicle door structure of claim 1, wherein the door glass run comprises of rubber material.

8. A vehicle door structure including a door frame, a door glass and a door glass run, the door frame including a front portion, an upper portion connected to the front portion and a rear portion connected to the upper portion, each of the portions of the door frame having a channel at an inner peripheral edge thereof, the door glass being mounted slidably on a vehicle door in the vertical direction of a vehicle, said door glass run being fitted into at least one of the channels of the door frame, the door glass run including a base portion, an inner lip portion and an outer lip portion, the base portion of the door glass run being secured to the door frame, the base portion of the door glass run extending in the lateral direction of the vehicle, the inner lip portion of the door glass run being connected to the base portion of the door glass run, the inner lip portion of the door glass run extending in the longitudinal direction of the vehicle and contacting an interior surface of the door glass, the outer lip portion of the door glass run being connected to the base portion of the door glass run and extending in the longitudinal direction of the vehicle, wherein the improvement comprises:

said outer lip portion of the door glass run including a tip portion and a prop portion, a cross-sectional shape of the outer lip portion of the door glass run being a wedge shape, a portion which connects the tip portion to the prop portion being in contact with an exterior surface of the door glass.

9. The vehicle door structure of claim 8, wherein the tip portion of the door glass run slants to the outer lip portion of the door glass run, and the prop portion of the door glass run is substantially perpendicular to the outer lip portion of the door glass run.

10. The vehicle door structure of claim 9, wherein an end of the tip portion of the door glass run is connected to the outer lip portion of the door glass run and an another end of the tip portion of the door glass run is connected to an end of the prop portion of the door glass run.

11. The vehicle door structure of claim 10, wherein an another end of the prop portion of the door glass run is separated from the outer lip portion of the door glass run.

12. The vehicle door structure of claim 10, wherein an another end of the prop portion of the door glass run is connected to the outer lip portion of the door glass run.

13. The vehicle door structure of claim 10, wherein a space is defined among the outer lip portion, the tip portion and the prop portion of the door glass run.

14. The vehicle door structure of claim 10, wherein the door glass run comprises rubber material.

15. A vehicle door structure, comprising:

a door frame having a front portion, an upper portion, a rear portion connected with the upper portion, and an inclined portion, said inclined portion connecting said upper portion to said front portion, each of said front, upper, rear and inclined portions including an inner peripheral portion and a channel located at said inner peripheral portion;

a vertically displacable door glass mounted on a vehicle door;

a door glass run positioned in each of said channels of said front, upper, rear and inclined portions, each of said door glass runs comprising a base portion secured to the door frame and extending laterally across the vehicle, an inner lip portion connected with the base portion and extending longitudinally along the vehicle, said inner lip portion including a tip end which contacts said door glass, and an outer lip portion connected with the base portion and extending in the longitudinal direction of the vehicle, the outer lip portion having a tip end which is wedge-shaped in cross-section, said tip end being integral with said outer lip portion, said wedge shape providing a space whereby said outer lip is flexible, said door glass contacting the outer lip portion, whereby when a door glass is upwardly displaced and the vehicle travels at high speeds which creates a difference in pressure between an interior compartment and an exterior surface of the vehicle, the outer lip portion functions to smoothly displace the door glass.

16. The vehicle door structure of claim 15, wherein the tip end of the outer lip portion of the door glass run is an open end.

17. The vehicle door structure of claim 15, wherein the tip end of the outer lip portion of the door glass run is a closed end.

18. The vehicle door structure of claim 15, wherein the door glass run comprises rubber material.

* * * * *